US006982936B2

United States Patent
Joung

(10) Patent No.: US 6,982,936 B2
(45) Date of Patent: Jan. 3, 2006

(54) METHOD OF COMPENSATING FOR SEEK ERRORS OF PICKUP ASSEMBLY

(75) Inventor: Il-Kweon Joung, Ansan-si (KR)

(73) Assignee: Samsung Electro-Mechanics Co., Ltd., Kyunggi-Do (KR)

(*) Notice: Subject to any disclaimer, the term of this patent is extended or adjusted under 35 U.S.C. 154(b) by 599 days.

(21) Appl. No.: 10/241,664

(22) Filed: Sep. 12, 2002

(65) Prior Publication Data

US 2003/0202432 A1 Oct. 30, 2003

(30) Foreign Application Priority Data

Apr. 26, 2002 (KR) ................................ 2002-23093

(51) Int. Cl.
G11B 7/00 (2006.01)
(52) U.S. Cl. ............................ 369/30.22; 369/53.35; 369/44.28; 369/44.32
(58) Field of Classification Search ............ 369/30.22, 369/30.16, 30.15, 13.02, 30.14, 53.35–53.37, 369/53.28, 53.23, 44.28–44.29, 44.27, 44.32, 369/44.35, 44.34, 53.12
See application file for complete search history.

(56) References Cited

U.S. PATENT DOCUMENTS

| 6,891,781 B2* | 5/2005 | Kadlec et al. ........... 369/44.27 |
| 6,891,789 B2* | 5/2005 | Watt et al. ................ 369/53.23 |
| 6,898,164 B2* | 5/2005 | Kadlec et al. ........... 369/53.28 |

* cited by examiner

Primary Examiner—Ali Neyzari
(74) Attorney, Agent, or Firm—Morgan, Lewis & Bockius LLP

(57) ABSTRACT

Disclosed herewith is a method of compensating for the seek errors of a pickup assembly. The method includes the steps of calculating a target track number to read data stored in an optical disc by transferring a pickup assembly across the optical disc; determining whether a seek error has to be compensated for in a radially outward direction of the optical disc; if the seek error has to be compensated for in a radially inward direction, compensating for the seek error; transferring the pickup assembly in the radially inward direction, reading an address of a current position of the pickup assembly, and determining whether the current position of the pickup assembly coincides with a target position; if the current position of the pickup assembly coincides with the target position, calculating the seek error in a radially inward direction and calculating an error compensation value in a radially inward direction; and storing the calculated error compensation value and using it to perform a next seek operation.

5 Claims, 2 Drawing Sheets

METHOD OF COMPENSATING FOR SEEK ERRORS OF PICKUP ASSEMBLY

BACKGROUND OF THE INVENTION

1. Field of the Invention

The present invention relates generally to a method of compensating for the seek errors of a pickup assembly, and more particularly to a method of compensating for the seek errors of a pickup assembly, which employs an algorithm that detects the tolerances of parts concerned with the transfer of a pickup assembly or variations in optical discs and compensates for the seek errors of the pickup assembly, thereby considerably reducing the seek time of a data processing apparatus using the pickup.

2. Description of the Prior Art

In general, in data processing apparatuses using optical pickups, such as a Compact Disc (CD) drive, a Digital Versatile Disc (DVD) drive, a Compact Disc-ReWritable (CD-RW) drive and the like, seek time, which is required for such a data processing apparatus to transfer its pickup assembly to a desired location on an optical disc and read data from the optical disc, is greatly affected by the performance of a pickup transfer mechanism for the transfer of the pickup assembly to the desirable position and an algorithm for the servo of the pickup. The performance of various kinds of data processing apparatuses using pickups is dependent upon seek speed at which data are sought.

However, various kinds of parts constituting such actual pickup transfer mechanisms have tolerances. Additionally, optical discs storing data have variations according to their manufacturers and kinds.

Therefore, in data processing apparatuses, such as the CD drive, the DVD drive, the CD-RW drive and the like, the seek time varies with products having their individual tolerances and with optical discs having variations in their track pitches.

SUMMARY OF THE INVENTION

Accordingly, the present invention has been made keeping in mind the above problems occurring in the prior art, an object of the present invention is to provide a method of compensating for the seek errors of a pickup assembly, which monitors, detects and compensates for the seek errors of a pickup assembly so as to prevent seek time from being lengthened by the tolerances of parts concerned with the transfer of the pickup assembly and variations in optical discs.

In order to accomplish the above object, the present invention provides a method of compensating for the seek errors of a pickup assembly, comprising the steps of: calculating a target track number using the number of frames of a track, a linear velocity, a track pitch, a radius of a track and the like to read data stored in an optical disc by transferring a pickup assembly across the optical disc; determining whether a seek error has to be compensated for in a radially outward direction of the optical disc; if the seek error has to be compensated for in a radially inward direction, compensating for the seek error; transferring the pickup assembly in the radially inward direction, reading an address of a current position of the pickup assembly, and determining whether the current position of the pickup assembly coincides with a target position; if the current position of the pickup assembly coincides with the target position, calculating the seek error in a radially inward direction and calculating an error compensation value in a radially inward direction; and storing the calculated error compensation value and using it as transfer data to perform a next seek operation of transferring the pickup assembly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
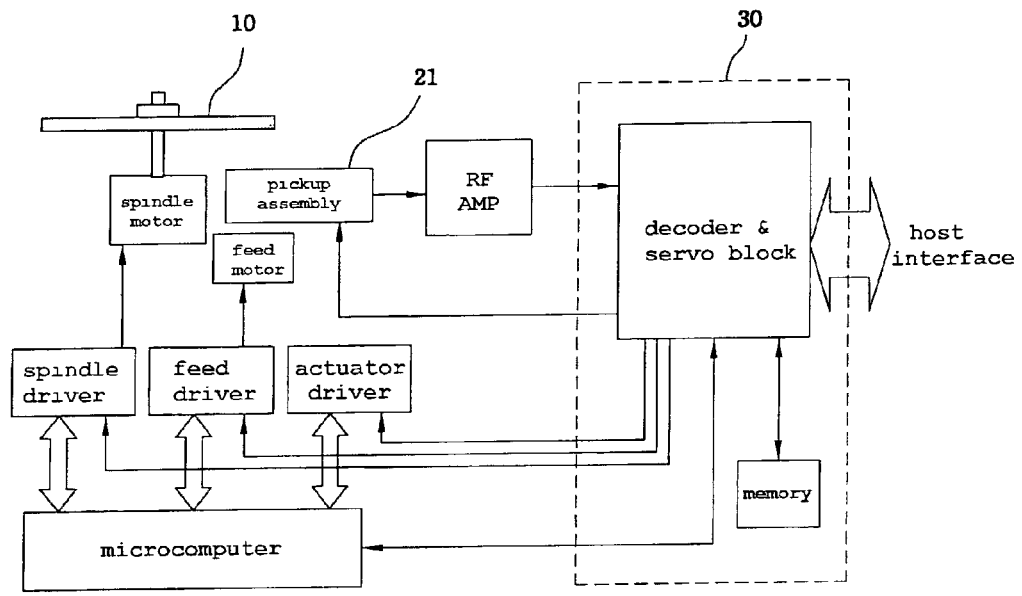
FIG. 1 is a block diagram schematically showing a data processing apparatus using an optical pickup in accordance with the present invention.
Figure 2:
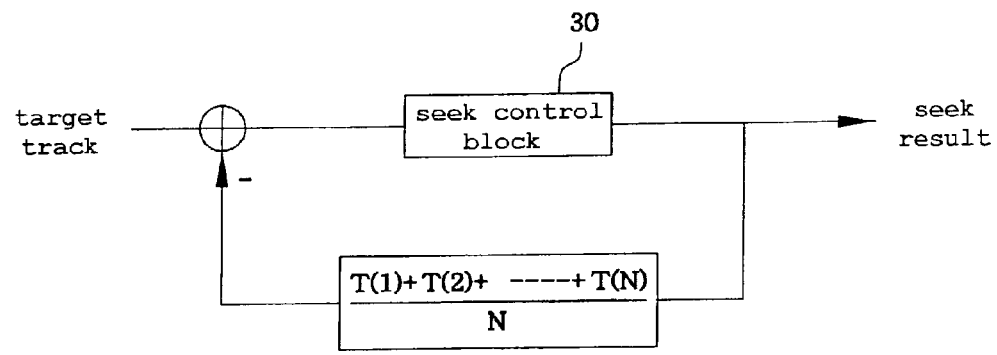
FIG. 2 is a conceptual view illustrating a method of compensating for the seek errors of a pickup assembly in accordance with the present invention.
Figure 3:
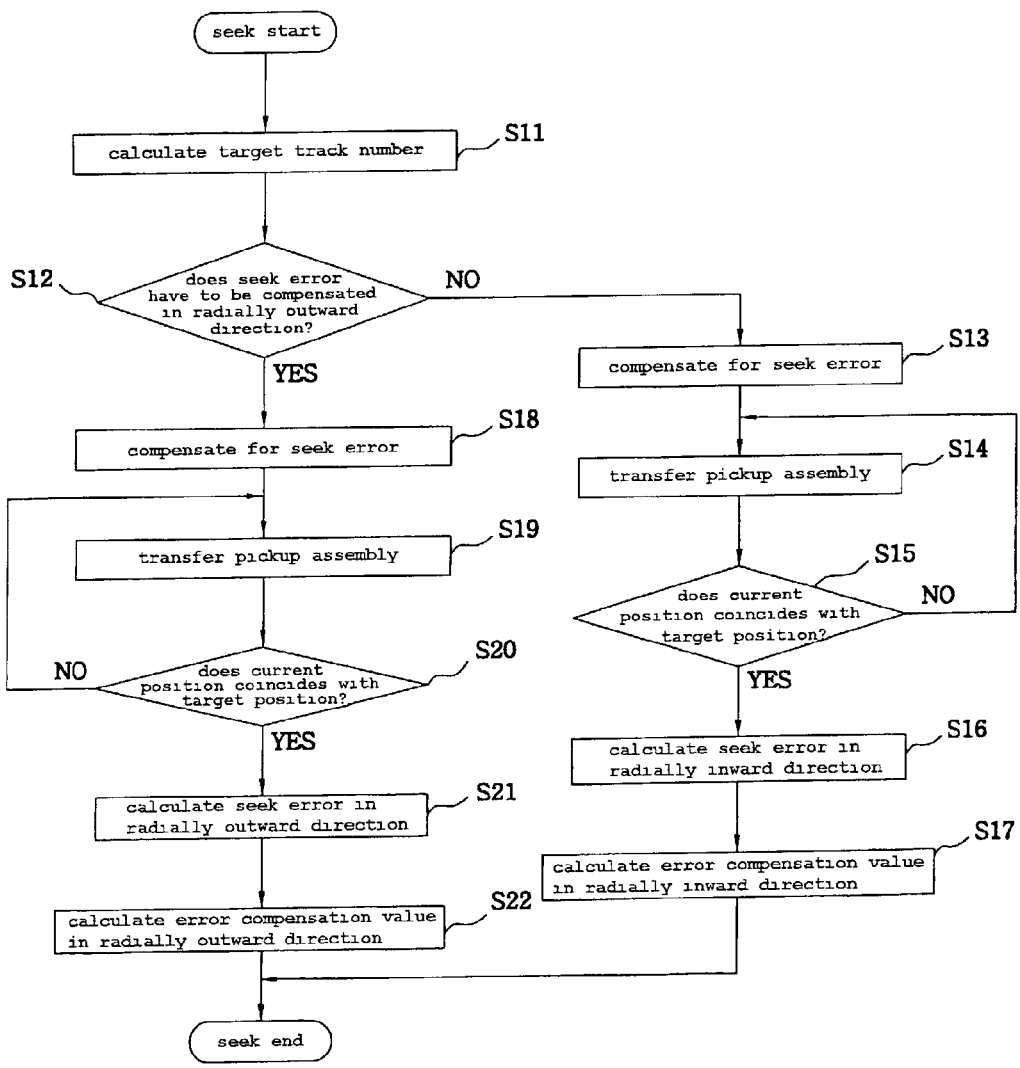
FIG. 3 is a flowchart illustrating a method of compensating for the seek errors of the pickup assembly in accordance with the present invention.

In the accompanying drawings, FIG. 1 is a block diagram schematically showing a data processing apparatus using an optical pickup in accordance with the present invention, FIG. 2 is a conceptual view illustrating a method of compensating for the seek errors of a pickup assembly in accordance with the present invention, and FIG. 3 is a flowchart illustrating a method of compensating for the seek errors of the pickup assembly in accordance with the present invention.

As shown in FIG. 1, in a data processing apparatus employing an optical pickup, in order to read data stored in an optical disc 10, target position information used to transfer a pickup assembly 21 is provided, and calculated in terms of a target track number with the target position information being related to the track structure of the optical disc 10.

Referring to FIG. 2, the calculated target track number is inputted to a seek control block 30 that serves to transfer the pickup assembly 21 to read data, and the seek control block 30 carries out a seek operation of transferring the pickup assembly 21.

However, when a current position to which the pickup assembly 21 is transferred does not coincide with a target position, a seek operation, as shown in FIG. 2, is carried out again to transfer the pickup assembly 21 by a new target track number corresponding to the difference between the two positions. In brief, a series of the seek operations is carried out until a current position coincides with the target position.

$$\frac{T(1) + T(2) + \Lambda + T(N)}{N} \qquad \text{[Equation 1]}$$

where N is the number of seek operations, T(N) is a seek error between the calculated target track number and the actually reached track number for an Nth seek operation, and $\{T(1)+T(2)+ \ldots +T(N)\}/N$ is the mean value of seek errors for N seek operations.

With reference to FIG. 3, there is described a method of compensating for the seek errors of the pickup assembly 21 in accordance with the present invention.

The seek control block 30 transfers the pickup assembly 21 to read data stored in the optical disk 10 and calculates a target track number with the number of the frames of a track, a linear velocity, a track pitch, the radius of a track and the like taken into account at step S11. Thereafter, it is determined whether a seek error is compensated for in the radially outward direction of the optical disc 10 at step S12. The blocks of the optical disc 10 in which data exist have addresses successive from a starting point on the inner periphery of the optical disc 10 to a last block on the outer periphery of the optical disc 10. Accordingly, if a negative value is obtained when the address of a current position is read and the address of the target position is subtracted from the address of the current position, it is determined that the pickup assembly 21 has to be transferred in a radially outward direction (that is, toward the outer periphery of the optical disc 10) to reach the target position. On the contrary, if a positive value is obtained when the address of the current position is read and the address of the target position is subtracted from the address of the current position, it is determined that the pickup assembly 21 has to be transferred in a radially inward direction (that is, toward the inner periphery of the optical disc 10) to reach the target position.

As the result of the determination at step S12, if the pickup assembly 21 has to be transferred in a radially inward direction, seek error compensation is carried out at step S13. In this case, a new target track number is calculated using the addresses of the current position and the target position. Thereafter, the pickup assembly 21 is transferred using the calculated new target track number, and a new current position to which the pickup assembly 21 is actually transferred is read. If this new current position coincides with the target position, the process stops. On the other hand, if the new current position does not coincide with the target position, a new-new target track number is calculated and the pickup assembly 21 is transferred again. In this case, the difference between the calculated target track number and the actually reached track number is stored and the second seek operation is carried out with this difference obtained as the result of the first transfer operation taken into account.

The second seek operation is to compensate for a seek error. Such an operation is carried out whenever the pickup assembly 21 is transferred. Additionally, the mean of the sum of the differences between the calculated target track numbers and the actually reached track numbers is taken for each transfer operation, and is used to compensate for each seek error.

Thereafter, after the above seek error compensation is carried out at step S13, the pickup assembly 21 is transferred at step S14. Subsequently, it is determined whether the current position of the pickup assembly 21 coincides with the target position at step S15. In this case, whether the current position of the pickup assembly 21 coincides with the target position can be determined by reading the address of a position to which the pickup assembly 21 is actually transferred.

If the current position of the pickup assembly 21 does not coincide with the target position, the seek operation of transferring the pickup assembly 21 is repeatedly carried out. On the other hand, if the current position of the pickup assembly 21 coincides with the target position, a seek error in a radially inward direction is calculated at step S16 and then an error compensation value in a radially inward direction is calculated at step S17. Accordingly, the calculated error compensation value is stored by the seek control block 30 and used as transfer data to perform a next operation of transferring the pickup assembly 21.

Whenever seek error compensation is carried out, the mean of the differences between the calculated target track numbers and the actually reached track numbers is taken, thereby calculating the error compensation value. The inward and outward error compensation values are separately calculated and stored.

The reason why the radially inward and outward error compensation values are separately managed is to overcome the tolerances of the parts concerned with the transfer of the pickup assembly 21 with minimal errors.

If as the result of determination at step S12, the seek error has to be compensated for in the radially outward direction, the seek error is compensated for at step S18. Thereafter, the pickup assembly 21 is transferred in the radically outward direction at step 19. Subsequently, it is determined whether the current position of the pickup assembly 21 coincides with a target position at step S20.

If the current position of the pickup assembly 21 coincides with the target position, the seek error in a radially outward direction is calculated at step S21, and an error compensation value in a radially outward direction is calculated at step S22. In this case, the calculated error compensation value is stored by the seek control block 30 and used as transfer data to perform a next operation of transferring the pickup assembly 21.

The seek control block 30 stores a positive value if a track number actually reached by the pickup assembly 21 is larger than the target track number, while the seek control block 30 stores a negative value if a track number actually reached by the pickup assembly 21 is smaller than the target track number. Accordingly, the seek control block 30 calculates the error compensation value by taking the mean of the sum of the seek errors.

When a next seek operation is carried out, compensation for the difference between the target track number and an actually reached track number is carried out using the error compensation value calculated on the basis of the previous seek operation. As further seek operations are carried out, the error compensation value is calculated to approach the target track number with regard to the tolerances of parts concerned with the transfer of the pickup assembly and variations in optical discs. The error compensation value can be stably obtained regardless of temporary abnormal variations in errors.

If seek operations are carried out with the error compensation value taken into account, the actually reached target number converges into the target track number in proportion to an increase in the number of seek operations.

As described above, the present invention provides a method of compensating for the seek errors of the pickup assembly in data processing apparatus, which can automatically compensate for the tolerances of parts concerned with the transfer of the pickup assembly and variations in optical discs, thus increasing speed at which the pickup can read data stored at a desired location on the optical disc and maintaining desired performance regardless of the various tolerances of parts concerned with the transfer of the pickup assembly and various variations in optical discs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of compensating for the seek errors of a pickup assembly, comprising the steps of:

calculating a target track number using the number of frames of a track, a linear velocity, a track pitch, a radius of a track and the like to read data stored in an optical disc by transferring a pickup assembly across the optical disc;

determining whether a seek error has to be compensated for in a radially outward direction of the optical disc;

if the seek error has to be compensated for in a radially inward direction, compensating for the seek error;

transferring the pickup assembly in the radially inward direction, reading an address of a current position of the pickup assembly, and determining whether the current position of the pickup assembly coincides with a target position;

if the current position of the pickup assembly coincides with the target position, calculating the seek error in a radially inward direction and calculating an error compensation value in a radially inward direction; and storing the calculated error compensation value and using it as transfer data to perform a next seek operation of transferring the pickup assembly.

2. The compensation method according to claim 1, further comprising the steps of:

if as the result of determining whether the seek error has to be compensated for in the radially outward direction of the optical disc, the seek error has to be compensated for in the radially outward direction, compensating for the seek error;

transferring the pickup assembly in the radically outward direction, reading an address of a current position of the pickup assembly, and determining whether the current position of the pickup assembly coincides with a target position;

if the current position of the pickup assembly coincides with the target position, calculating a seek error in a radially outward direction and calculating an error compensation value in a radially outward direction; and storing the calculated error compensation value and using it as transfer data to perform a next seek operation of transferring the pickup assembly.

3. The compensation method according to claim 1, wherein the step of determining whether a seek error has to be compensated for in a radially outward direction comprises the steps of subtracting an address of the target position from an address of a current position of the pickup assembly, and determining that the seek error has to be compensated for in the radially outward direction if a negative value is obtained as the result of the subtraction and that that the seek error has to be compensated for in the radially inward direction if a positive value is obtained as the result of the subtraction.

4. The compensation method according to claim 1, wherein the step of compensating for the seek error comprises the steps of:

stopping if the current position coincides with the target position, and calculating a new target track number and transferring the pickup assembly if the current position does not coincide with the target position;

storing a difference between the calculated target track number and the actually reached track number and performing the next seek operation with the difference taken into account; and performing the seek error compensation whenever the pickup assembly is transferred, taking a mean of a sum of differences between calculated target track numbers and actually reached track numbers for each transfer operation and using the mean to compensate for each seek error.

5. The compensation method according to claim 1, wherein the step of calculating the error compensation value in the radially inward direction is carried out in such a way that a mean of a sum of differences between target track numbers and actually reached track numbers is taken with the error compensation value separately calculated and managed depending upon whether the pickup assembly 21 is radially inwardly or outwardly moved.

* * * * *